United States Patent
Arndt et al.

(10) Patent No.: US 8,424,015 B2
(45) Date of Patent: Apr. 16, 2013

(54) TRANSACTIONAL MEMORY PREEMPTION MECHANISM

(75) Inventors: Richard L. Arndt, Austin, TX (US); Harold W. Cain, III, Hartsdale, NY (US); Bradly G. Frey, Austin, TX (US); Cathy May, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 12/894,308

(22) Filed: Sep. 30, 2010

(65) Prior Publication Data
US 2012/0084477 A1 Apr. 5, 2012

(51) Int. Cl.
G06F 9/46 (2006.01)
G06F 15/00 (2006.01)
G06F 11/00 (2006.01)
G06F 13/24 (2006.01)

(52) U.S. Cl.
USPC ........... 718/108; 718/102; 710/260; 710/266; 712/228; 714/13; 714/15

(58) Field of Classification Search .................. None
See application file for complete search history.

(56) References Cited

U.S. PATENT DOCUMENTS

| | | | |
|---|---|---|---|
| 5,907,673 A * | 5/1999 | Hirayama et al. ............... 714/16 |
| 6,202,079 B1 | 3/2001 | Banks |
| 6,795,966 B1 | 9/2004 | Lim et al. |
| 7,376,860 B2 | 5/2008 | Jia et al. |
| 7,882,339 B2 * | 2/2011 | Jacobson et al. ............... 712/244 |
| 7,987,386 B2 * | 7/2011 | Jia et al. .......................... 714/13 |
| 2006/0294326 A1 * | 12/2006 | Jacobson et al. ............... 711/156 |
| 2008/0016325 A1 | 1/2008 | Laudon et al. |
| 2008/0216089 A1 * | 9/2008 | Jia et al. ......................... 719/312 |
| 2009/0254905 A1 | 10/2009 | Yip et al. |
| 2010/0023703 A1 * | 1/2010 | Christie et al. ................ 711/147 |
| 2010/0077368 A1 | 3/2010 | Papa et al. |
| 2011/0119528 A1 * | 5/2011 | Karlsson et al. ................ 714/25 |
| 2011/0209151 A1 * | 8/2011 | Chung et al. ................... 718/101 |
| 2011/0264898 A1 * | 10/2011 | Chaudhry et al. ............. 712/228 |
| 2011/0296148 A1 | 12/2011 | Cain, III et al. |
| 2012/0005461 A1 * | 1/2012 | Moir et al. ...................... 712/228 |

OTHER PUBLICATIONS

U.S. Appl. No. 13/465,115.
U.S. Appl. No. 12/788,351.
Bobba, Jayaram et al., "Performance Pathologies in Hardware Transactional Memory", ACM, ISCA '07, Jun. 9-13, 2007, 11 pages.

(Continued)

Primary Examiner — Jennifer To
(74) Attorney, Agent, or Firm — Stephen J. Walder, Jr.; Matthew B. Talpis (57) ABSTRACT

Mechanisms for executing a transaction in the data processing system are provided. A transaction checkpoint data structure is generated in internal registers of a processor. The transaction checkpoint data structure stores transaction checkpoint data representing a state of program registers at a time prior to execution of a corresponding transaction. The transaction, which comprises a first portion of code that is to be executed by the processor, is executed. An interrupt of the transaction is received while executing the transaction and, as a result, the transaction checkpoint data is stored to a data structure in a memory of the data processing system. A second portion of code is then executed. A state of the program registers is restored using the data structure in the memory of the data processing system in response to an event occurring causing a switch of execution of the processor back to execution of the transaction.

10 Claims, 6 Drawing Sheets

OTHER PUBLICATIONS

Herlihy, Maurice et al., "Transactional Memory: Architectural Support for Lock-Free Data Structures", Proceedings of the 20th Annual International Symposium on Computer Architecture, May 1993, pp. 289-300.

Moravan, Michelle J. et al., "Supporting Nested Transactional Memory in LogTM", Proceedings of the 12th International Conference on Architectural Support for Programming Languages and Operating Systems (ASPLOS), San Jose, CA, Oct. 21-25, 2006, pp. 1-12.

Zilles, Craig et al., "Extending Hardware Transactional Memory to Support Non-busy Waiting and Non-transactional Actions", Workshop on Transactional Memory, 2006, 10 pages.

Office Action mailed Dec. 5, 2012 for U.S. Appl. No. 13/465,115; 12 pages.

* cited by examiner

TRANSACTIONAL MEMORY PREEMPTION MECHANISM

BACKGROUND

The present application relates generally to an improved data processing apparatus and method and more specifically to implementing transactional memory preemption mechanisms.

In speculative parallelization systems, also known as thread-level speculation (TLS) or multi-scalar systems, a compiler, runtime system, or programmer may divide the execution of a program among multiple threads, i.e. separately managed sequences of instructions that may execute in parallel with other sequences of instructions (or "threads"), with the expectation that those threads will usually be independent, meaning that no thread will write data that other threads are reading or writing concurrently. Due to the difficulty in statically determining the memory locations that will be accessed by threads at compilation time, this expectation is not always met. The parallel threads may actually make conflicting data accesses. Such parallelization systems use speculative execution to attempt to execute such threads in parallel. It is the responsibility of the system to detect when two speculative threads make conflicting data accesses, and recover from such a mis-speculation.

Each parallel thread corresponds to a segment of the original sequential code, and the parallel threads are therefore ordered with respect to one another according to their sequence in the sequential version of code. It is the responsibility of the system to ensure that the results of a speculative thread are not committed until all prior speculative threads in this sequence are known to be free of conflicts with the committing thread. Once it has been determined that the thread does not conflict with any threads in the prior sequence, and prior threads have committed, that thread may commit.

Systems that support transactional memory typically include a subset of the requirements of a system that supports speculative parallelization. Transactional memory attempts to simplify concurrent or parallel programming by allowing a group of load and store instructions to execute in an atomic manner, i.e. it is guaranteed that either (1) all instructions of the transaction complete successfully or (2) no effects of the instructions of the transactions occur, i.e. the transaction is aborted and any changes made by the execution of the instructions in the transaction are rolled-back. In this way, with atomic transactions, the instructions of the transaction appear to occur all at once in a single instant between invocation and results being generated.

Hardware transactional memory systems may have modifications to the processors, caches, and bus protocols to support transactions or transaction blocks, i.e. groups of instructions that are to be executed atomically as one unit. Software transactional memory provides transactional memory semantics in a software runtime library with minimal hardware support.

As described in Bobba et al., "Performance Pathologies in Hardware Transactional Memory," ISCA '07, Jun. 9-13, 2007, a programmer can invoke a transaction in a multi-threaded application and rely on the transactional memory system to make its execution appear atomic in a global serial order. Bobba et al. discusses conflict resolution policies in transactional memory systems, however, the concept of transactional memory was introduced by Herlihy and Moss "Transactional Memory: Architectural Support for Lock-Free Data Structures," Proceedings of the 20th Annual International Symposium on Computer Architecture, pp. 289-300, May 1993.

Transactional memory systems seek high performance by speculatively executing transactions concurrently and only committing transactions that are non-conflicting. A conflict occurs when two or more concurrent transactions access the same piece of data, e.g. a word, block, object, etc., and at least one access is a write. Transactional memory systems may resolve some conflicts by stalling or aborting one or more transactions.

Transactional blocks are typically demarcated in a program with special transaction begin and end annotations. Transactional blocks may be uniquely identified by a static identifier, e.g., the address of the first instruction in the transactional block. Dynamically, multiple threads can concurrently enter a transactional block, although that transactional block will still share the same static identifier.

In addition to the ability to revert, or roll-back, changes made to memory and registers made during the speculative execution of a transaction, transactional memory systems often support the detection of conflicting accesses made by speculative threads. However, maintaining the proper ordering of speculative threads is not naturally supported by transactional memory systems. Because a transaction should not commit until prior speculative threads in the sequence have committed, some communication among speculative threads is required. However, by definition, transactions are intended to be isolated from one another such that any communication amongst transaction threads through shared memory will cause the transactions to be aborted.

SUMMARY

In one illustrative embodiment, a method exists in a data processing system having a processor and a memory, for executing a transaction in the data processing system. The method comprises generating a transaction checkpoint data structure in internal registers of the processor. The transaction checkpoint data structure stores transaction checkpoint data representing a state of program registers at a time prior to execution of a corresponding transaction. The method further comprises executing, by the processor, the transaction which comprises a first portion of code that is to be executed by the processor. The method also comprises receiving, by the processor, an interrupt of the transaction while executing the transaction. Further, the method comprises storing the transaction checkpoint data to a data structure in the memory of the data processing system in response to receiving the interrupt and executing a second portion of code, different than the first portion of code. In addition, the method comprises restoring a state of the program registers using the data structure in the memory of the data processing system in response to an event occurring causing a switch of execution of the processor back to execution of the transaction.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiments.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiments.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

In transactional memory systems, updates to memory performed during a transaction are discarded if the transaction is aborted. With a transactional memory system, a checkpoint of the processor context is generated at the beginning of the transaction, i.e. a copy of the state of the processor registers, e.g., program registers used to store state information for an executing program, at the beginning of a transaction is stored, so that the checkpoint may be used to restore the processor state to the checkpointed state should the transaction need to be aborted. Thus, with a transactional memory, the checkpoint is generated at the beginning of the transaction and the series of elemental operations that make up the transaction are performed without making any of the intermediate memory updates visible to other processors of the data processing system. These intermediate memory updates are only made visible to the other processors once the transaction commits at the end of the transaction.

With transactional memory systems, when a transaction begins, the memory is maintained at a state that corresponds to the beginning of the transaction. After the processor begins the transaction, it builds a log of pending memory updates in a processor structure (usually associated with the processor memory cache).

At transaction commit time, the processor checks whether any other thread on the same or different processor made a change to the memory state of the data processing system that might have affected the computations of the transaction. If such changes were made by another thread on the same or different processor, the intermediate memory updates computed during the transaction, as specified in the log of pending memory updates, are discarded and the processor context is restored to the context saved by the checkpoint at the beginning of the transaction. If no other thread on the same or different processor changed the memory state used by the transaction, then all intermediate memory updates made by the transaction, as specified in the log of pending memory updates, are committed to the system memory as a single unit and are thereby made visible to other processors of the data processing system.

There are two main approaches to creating a transaction context checkpoint. In a first approach, the processor's architected state, i.e. the state of the processor registers at the time of the checkpoint, is saved or copied to an in-memory checkpoint data structure, e.g., a memory stack. The advantage of this approach is that it is very scalable and easy to manage. That is, because memories have a relatively large amount of storage space, the memory is capable of storing larger size checkpoints and a larger number of checkpoints. However, the time to create and restore the checkpoint is relatively long since creating and restoring checkpoints requires accessing a memory and thus, incurring the delay of the memory interfaces and other elements needed to access the memory data structures.

In a second approach, the processor's architected state is copied or saved in a set of internal processor registers. The advantage of this approach is that the time to create and restore the checkpoint can be relatively very short since the delay associated with accessing memory is avoided by using internal registers of the processor. However, the number of checkpoints that the processor can maintain is very limited due to the limited number of sets of registers in the processor that can be used for the purpose of storing checkpoints. That is, the number of registers in a processor is very small when compared to the size of a memory array. This leads to a problem when having to generate multiple checkpoints, such as when a transaction that is being executed by a processor is preempted to run another thread or program that also needs to perform a transaction. Since multiple checkpoints for multiple transactions need to be maintained in the processor's internal registers, if the processor only has enough processor registers to maintain a single checkpoint, an error condition may occur.

The illustrative embodiments provide a mechanism for supporting transactional memory preemption and checkpointing using a hybrid approach in which internal processor registers are used for transaction checkpoints and memory is used to store such checkpoints in the event that a transaction is preempted by another program. That is, the illustrative embodiments provide mechanisms for managing processor context checkpoints maintained in internal processor registers when a processor is preempted to execute another program, e.g., another thread executing another portion of a same or different program. With the mechanisms of the illustrative embodiments, when a transaction begins, the processor stores the architected state of the processor, i.e. the state of the processor registers, to a set of internal processor registers in order to generate a transaction checkpoint for the transaction. The transaction checkpoint stores the particular state of the processor registers just prior to beginning the execution of the transaction and is used for rolling back changes made by the transaction by resetting the processor to that of the checkpoint in the event that a roll-back of the transaction becomes necessary. Once the transaction checkpoint is created in the internal processor registers, the processor begins performing the series of elemental operations that make up the transaction.

It should be noted that the memory state does not need to be rolled back when the transaction aborts because any changes to memory state that were ordered by the incomplete transaction are held pending until the transaction completes and the changes are atomically committed. Should the transaction be aborted and the processor state rolled back to the beginning of the transaction, any such pending memory changes are discarded.

If, during execution of the transaction's elemental operations, an interrupt occurs requiring a change in the thread or program being executed by the processor, then the transaction is preempted. As a result, an interrupt handler stores an "interrupt context" to memory. Historically, when an interrupt occurs, an interrupt handler performs a "processor state save," i.e. it saves the processor architected state. However, in the illustrative embodiments, the "interrupt context" comprises two portions of information. A first portion of the interrupt context stores the non-transaction state information, i.e. the state saved by interrupt handlers historically or when not executing a transaction. This is referred to herein as the "pre-empted program architected state." A second portion of the interrupt context stores the transaction state information obtained from the transaction checkpoint stored in the internal processor registers. Thus, the interrupt context comprises the non-transactional state information of processor registers and the transactional checkpoint that was generated at the beginning of the transaction.

Thus, the interrupt handler, when the interrupt occurs during the execution of a transaction, stores the current architected state of the processor to a portion of memory to thereby generate the first half of an interrupt context record for the program executing the first transaction, i.e. the "preempted program architected state." The interrupt handler then executes a transaction reclaim (Treclaim) instruction to restore the processor state to that of the transaction checkpoint maintained in the internal processor registers. In this way, the state of the processor is restored or rolled-back to a state just prior to beginning the transaction.

Once the processor state is restored to the transaction checkpointed state from the internal processor registers, the interrupt handler appends the restored transaction checkpoint state to the interrupt context record in memory. In this way, the interrupt handler stores the second half of the interrupt context that is a copy of the transaction checkpoint stored in memory. Thus, with the mechanisms of the illustrative embodiments, when a transaction is to be executed, the transaction checkpoint is stored in internal processor registers and is copied to memory in response to the transaction being interrupted, or preempted, by the execution of another program, which itself may or may not be executing a transaction.

Having generated the interrupt context record in memory in response to the interrupt, the operating system of the data processing system selects another thread or program to execute on the processor, referred to hereafter as the "preempting program." This preempting program may itself execute a transaction that preempts the original transaction. However, it should be appreciated that the preempting program need not be executed as a transaction but may in fact in a standard or non-transactional manner. Each preemption of a transaction may cause an additional interrupt context record to be generated in the memory such that a number of interrupt context records, each of which might contain a transaction checkpoint (if the interrupted program was executing within a transaction), may be maintained in the memory at substantially the same time. These interrupt context records are generated by the interrupt handler as it begins to handle the interrupt condition so that the interrupted program can be restarted later. As the interrupt handler comes to the end of its processing, it selects a previously saved interrupt context record to restore (thus restarting some previously interrupted program). This list of interrupt context records can become arbitrarily long and the interrupt handler chooses which specific interrupt context record to restore based upon many factors to optimize the performance of the computer system.

Once the interrupt context record for the preempted transaction is stored to the memory, and the operating system selects another program, i.e. the preempting program, to execute, the operating system loads the architected state for the preempting program. If the preempting program is executing or will be executed as a transaction, this second transaction itself may have a checkpoint, e.g., is another preempted transaction, and as a result, the loading of the architected state for the second transaction may involve loading a transaction checkpointed state for this second transaction. The processor then executes the preempting program.

At a later time, such as after completion of the execution of the preempting program, or in response to an event, such as a time slice interrupt or the like, the operating system may initiate a switch back from the preempting program to the program which was running the transaction. The operating system then restores the architected processor state to the state corresponding to the transaction checkpoint for the preempted transaction by using the information in the transaction checkpoint section of the interrupt context record, corresponding to the preempted transaction, stored in memory. The operating system then initiates a transaction re-checkpoint (Trecheckpoint) instruction to regenerate the transaction checkpoint for the preempted transaction. The Trecheckpoint instruction creates a transaction checkpoint similar to the transaction checkpoint created at the beginning of the preempted transaction but with an indicator that indicates that the checkpoint is generated at some point in the middle of the transaction execution rather than at the beginning, i.e. it is an intermediate transaction checkpoint. The purpose for this indicator is to inform the processor hardware that some information about transaction data accesses might have been lost and, if so, the transaction needs to be aborted and this checkpoint is to be used to roll back the processor state to that just prior to the start of the transaction.

The architected state of the processor is then restored, by the operating system, to match the state at the time that the preempted transaction was interrupted. The architected state of the processor is restored using the information in the first section of the interrupt context record, for the program corresponding to the preempted transaction, stored in memory. The execution of the program corresponding to the preempted transaction is then restarted, which then completes the preempted transaction unless another preemption occurs at which time the process is repeated as above. The completion of the preempted transaction may include retrying the preempted transaction if the hardware needs to abort the transaction because of the loss of information relative to storage operations performed by the preempted transaction prior to it being preempted.

Thus, with the mechanisms of the illustrative embodiments, unless a transaction is pre-empted, the transaction checkpoint is stored in internal processor registers, thereby taking advantage of the speed by which internal processor registers may be accessed. If a transaction is pre-empted, then the checkpoint information for the transaction is stored to memory and may then be restored from memory once the thread/program that preempts the transaction is completed or another event initiates a switch back to the pre-empted transaction. This storing of transaction checkpoint data to the memory and restoring the transaction checkpoint data from memory may be performed at any layer of software/firmware in the data processing system.

The majority of transactions executed by the processor are expected to complete without experiencing preemption. Thus, for the majority of transactions, the speed of storing transaction checkpoints to internal processor registers is achieved thereby making the processing of transactions more efficient by avoiding the time delay associated with storing checkpoint data to memory. For the minority of transactions that are preempted, the time delay associated with saving the transaction checkpoint to memory is incurred, but the scalability of being able to store more than one transaction checkpoint is achieved through use of the memory.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
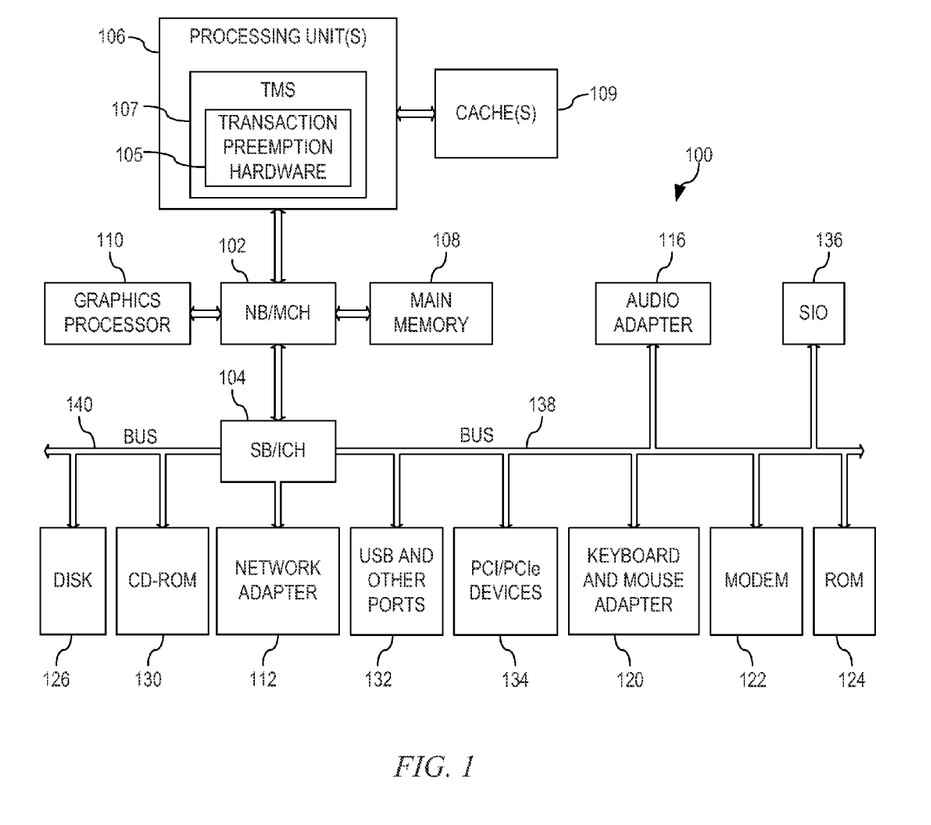
FIG. 1 is a block diagram of a data processing system is shown in which illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIG. 1 is provided hereafter as an example environment in which aspects of the illustrative embodiments may be implemented. FIG. 1 is only an example and is not intended to state or imply any limitation with regard to the various data processing system configurations, architectures, and the like, that may be used with the mechanisms of the illustrative embodiments. In short, the mechanisms of the illustrative embodiments may be implemented with any data processing system that implements a transactional memory system.

With reference now to FIG. 1, a block diagram of a data processing system is shown in which illustrative embodiments may be implemented. Data processing system 100 is an example of a computer in which computer usable code or instructions implementing the processes may be located for the illustrative embodiments.

In the depicted example, data processing system 100 employs a hub architecture including a north bridge and memory controller hub (MCH) 102 and a south bridge and input/output (I/O) controller hub (ICH) 104. Processing unit 106, main memory 108, and graphics processor 110 are coupled to north bridge and memory controller hub 102. Processing unit 106 may contain one or more processors and even may be implemented using one or more heterogeneous processor systems. Graphics processor 110 may be coupled to the MCH through an accelerated graphics port (AGP), for example.

In the depicted example, local area network (LAN) adapter 112 is coupled to south bridge and I/O controller hub 104 and audio adapter 116, keyboard and mouse adapter 120, modem 122, read only memory (ROM) 124, universal serial bus (USB) ports and other communications ports 132, and PCI/PCIe devices 134 are coupled to south bridge and I/O controller hub 104 through bus 138, and hard disk drive (HDD) 126 and CD-ROM drive 130 are coupled to south bridge and I/O controller hub 104 through bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be coupled to south bridge and I/O controller hub 104.

An operating system runs on processing unit 106 and coordinates and provides control of various components within data processing system 100 in FIG. 1. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 100. Java and all Java-based trademarks are trademarks of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processing unit 106. The processes of the illustrative embodiments may be performed by processing unit 106 using computer implemented instructions, which may be located in a memory such as, for example, main memory 108, read only memory 124, or in one or more peripheral devices.

A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted examples in FIG. 1 and above-described examples are not meant to imply architectural limitations. For example, data processing system 100 also may be a tablet computer, laptop computer, or telephone device in addition to taking the form of a PDA.

In accordance with the mechanisms of the illustrative embodiments, the data processing system of FIG. 1 implements a transactional memory system 107. This transactional memory system 107 may be implemented with regard to one or more caches 109 associated with the processing unit(s) 106, the main memory 108, a combination of caches 109 and main memory 108, or the like. As noted above, the transactional memory system 107 may be implemented as a hardware transactional memory system, software transactional memory system, or a hybrid hardware/software transactional memory system. In accordance with the illustrative embodiments, a hybrid hardware/software transactional memory system 107 is utilized in which transaction preemption hardware 105 is provided in the processing unit(s) 106 and software mechanisms are executed by the processing units 106 to support transaction preemption using both internal processor registers and memory with regard to the transactional memory system 107.

As discussed above, the transactional memory system 107 of the illustrative embodiments utilizes a set of hardware interfaces, in the transaction preemption hardware 105, for use by an operating system, hypervisor, virtualization intermediary, or the like, (hereafter assumed to be an operating system for simplicity of the description) that provides a functionality to save the processor register states for a transaction to internal processor registers when a transaction begins, thereby providing a transaction checkpoint for the transaction should the transaction need to be aborted. Hardware and/or software logic is provided in this transactional memory system 107 for determining when a transaction is preempted by another program. The hardware and/or software logic of the transactional memory system 107, in the event of the preemption causes checkpoint data for the transaction to be written out to the memory so that it may be restored at a later time in response to an event, e.g. time slice interrupt or the like, or after completion of the preempting program, assumed hereafter to be another transaction but this is not required. The hardware and/or software logic of the transactional memory system 107 may further support new instructions, i.e. the Treclaim and Trecheckpoint instructions, that may be issued by the operating system and/or an interrupt handler associated with the operating system, for regenerating checkpoints and restoring checkpointed states, as described in greater detail hereafter.

Figure 2:
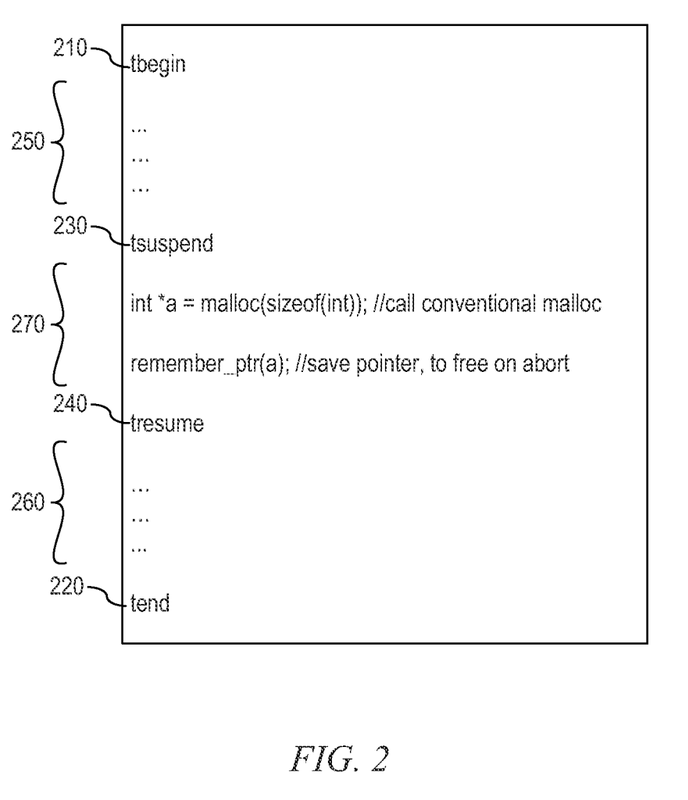
FIG. 2 is an example diagram illustrating a portion of code to be executed as a transaction with a transactional memory system in accordance with one illustrative embodiment.

FIG. 2 is an example diagram illustrating a portion of code to be executed as a transaction with a transactional memory system, such as transactional memory system 107 in FIG. 1, in accordance with one illustrative embodiment. Transactions, such as the one shown in FIG. 2, for example, in the transactional memory system 107 of the illustrative embodiments are initiated using a transaction begin instruction "tbegin" 210 in the portion of code constituting the transaction, e.g., portions 250 and 260, and are ended with a transaction end instruction "tend" 220. During execution of the transaction, the processing unit(s) 106 execute in a transactional mode that includes use of a transaction controller that has a transaction abort engine for detecting transaction failures and performing abort operations to roll-back changes made by the transaction to the memory, i.e. cache(s) 109 and/or main memory 108. A transaction may be suspended using a suspend instruction "tsuspend" 230 or as a side-effect of an interrupt. Once suspended, the transaction may be resumed using a resume instruction "tresume" 240, or after return from an interrupt.

During suspended transactional execution, i.e. when the transaction is preempted by other code, the processing unit(s) 106 executes in a suspended or preempted mode. Such suspension or preemption may occur, for example, as a result of an interrupt occurring during the execution of the transaction, e.g., in the middle of transaction block 250 or 260, the execution of a transaction suspend instruction 230, or the like. Interrupts or suspensions of a transaction may occur for any of a number of different reasons including completion of an input/output operation, address translation faults, arithmetic check operations, time slide interrupts, etc. For purposes of the description of the illustrative embodiments, the interrupt or suspension of a transaction is such that the processor is to execute another portion of code, e.g., another thread, program, transaction, or the like.

The transactional mode and suspended/preempted mode of operation of the processing units 106 may be identified by an appropriate mode register in the processing units 106 that identifies an operating mode of the corresponding processing unit 106. Hardware logic may be provided in the processing units 106 such that the value in this mode register may be set in response to a "tbegin," "tend", "tsuspend", or "tresume" instruction being processed by the processing unit 106. For example, when a tbegin instruction is executed, the value in the mode register may be set to indicate that the processing unit 106 is operating in a transaction mode. When a tsuspend instruction is executed or an interrupt occurs while the processing unit 106 is in the transaction mode, the value in the mode register may be set to indicate that the processing unit 106 is operating in a suspended or preempted mode of operation. When a tresume instruction is executed, the value in the mode register may be set to indicate that the processing unit 106 is operating in a transaction mode. When a tend instruction is executed, the value in the mode register may be set to indicate that the processing unit 106 is operating in a non-transaction mode.

When an interrupt occurs, the interrupt causes the operating system executing on the processing unit 106 to be invoked so that an interrupt handler can handle the interrupt appropriately. The operating system may check the mode register to determine if the processing unit 106 is currently in a transaction mode. If not, then the interrupt is handled by the operating system in a normal fashion by invoking an appropriate interrupt handler which then handles the interrupt and returns control back to the executing code after the interrupt is handled. If the interrupt occurs while the processing unit 106 is in a transaction mode, e.g., the interrupt occurs in transaction code block 250 or 260 in FIG. 2, the operating system may reset the value of the mode register to a suspended or preempted mode value and may invoke an interrupt handler to handle the interrupt. The interrupt handler may perform various operations for generating an interrupt context record associated with the program of the preempted or interrupted transaction, and storing it to memory before the operating system selects and initiates execution of another portion of code, i.e. the preempting program. Once the preempting program completes execution, or another interrupt occurs requiring a switching back to the original transaction, the operating system may reset the mode register to a value indicating that the processing unit 106 is in a transaction mode, restore the processor state based on the transaction checkpoint information stored in the interrupt context record in memory, and may initiate the regeneration of the transaction checkpoint for the transaction. Thereafter, the operating system may initiate a recovery and resumption of the transaction. Once the transaction is completed, the operating system may set the mode register value to a non-transaction mode value.

Figure 3:
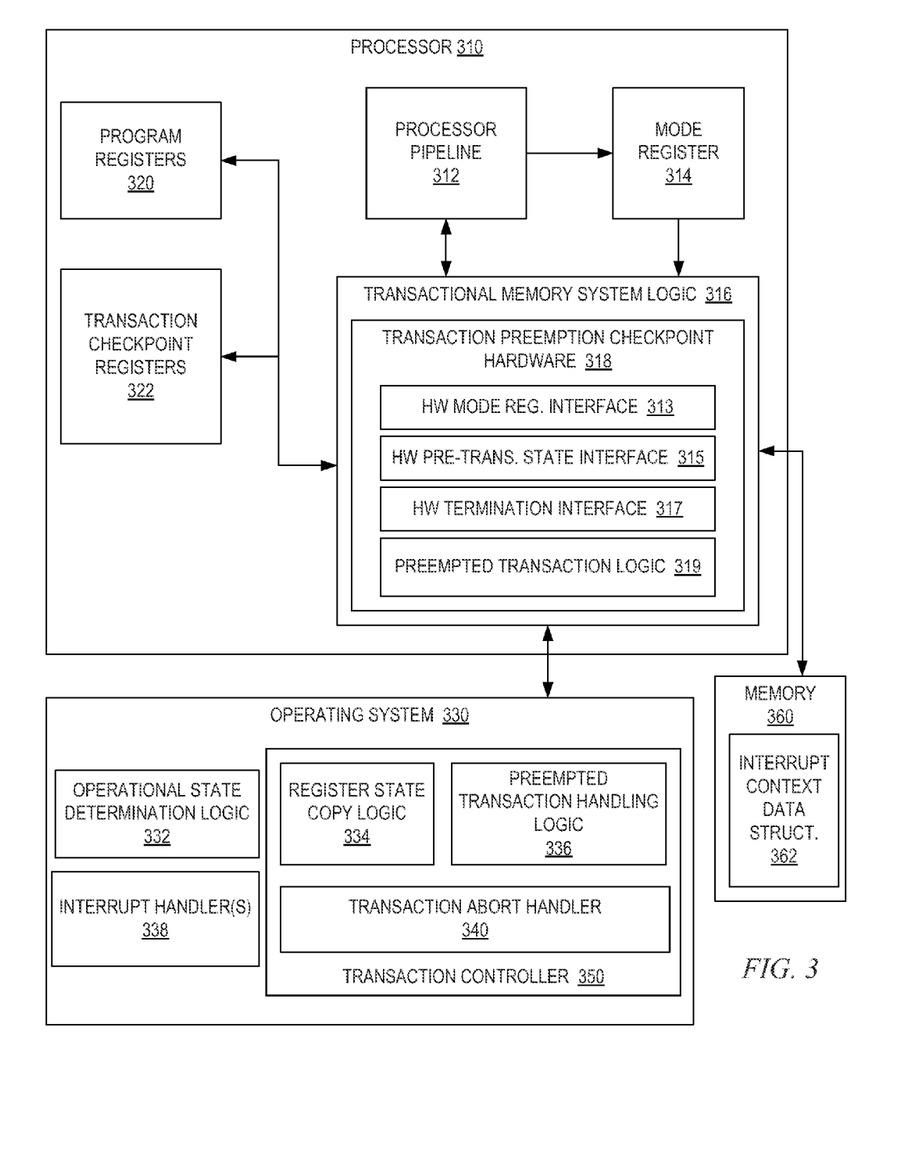
FIG. 3 is an example diagram illustrating hardware and software support mechanisms for supporting transaction preemption in accordance with one illustrative embodiment.

In order to provide support for managing transaction checkpoints when a transaction is preempted, in accordance with the illustrative embodiments, various hardware support mechanisms are provided in the processing unit(s) 106 and software support mechanisms are provided in an operating system, hypervisor, virtualization intermediary, or other low level software close to the hardware. FIG. 3 is an example diagram illustrating these hardware and software support mechanisms for supporting transaction preemption in accordance with one illustrative embodiment.

As shown in FIG. 3, the processor 310 comprises, among other elements not shown, a processor pipeline 312, a mode register 314, transactional memory system logic 316, program registers 320, and transaction checkpoint registers 322. The transactional memory system logic 316 further comprises transaction preemption checkpoint hardware 318 for implementing various functionalities for implementing the illustrative embodiments from a hardware and/or firmware perspective. In order to facilitate transaction checkpoint management for preempted transactions in accordance with the illustrative embodiments, the hardware 318 includes a hardware (HW) mode register interface 313, a hardware pre-transaction state interface 315, a hardware termination interface 317, and preempted transaction logic 319. These elements operate in concert with the processor pipeline 312, mode register 314, program registers 320, transaction checkpoint registers 322, and interrupt context record data structures 362 in memory 360 to implement the operations and functionality as described herein to support transaction checkpoint management for preempted transactions. These elements further work in concert with software mechanisms provided in an operating system, hypervisor, virtualization intermediary, or the like (generally represented as operating system 330 in FIG. 3). The elements shown as part of processor 310 are implemented in hardware, such as circuitry and logic elements, on an integrated circuit chip or chips, multi-chip module, or the like.

As shown in FIG. 3, the operating system 330 may include a transaction controller 350 having operational state determination logic 332, register state copy logic 334, preempted transaction handling logic 336, interrupt handler(s) 338, and transaction abort handler 340. The elements shown as being part of operating system 330 are implemented as software, i.e. a set of code or instructions, that is executed on one or more processors of a data processing system, such as processor 310. The software elements of the operating system 330 operate with the hardware elements of the processor 310 to support the management of transaction checkpoints for preempted transactions in accordance with the illustrative embodiments described herein and equivalents thereof.

With reference to the particular elements shown in FIG. 3, portions of code are executed by the processor 310 through processor pipeline 312 as is generally known in the art. In accordance with the illustrative embodiments, as part of the execution of the code, instructions processed in the processor pipeline 312 may be decoded and, as a result, certain instructions may cause a value in the mode register 314 to be set to various values indicating a current execution mode of the processor 310. For example, in response to the decoding of an instruction indicating an opcode for a transaction begin instruction (tbegin), the hardware of the processor 310 may set a value in the mode register 314 indicating that the processor 310 is operating in a transaction mode. In response to the decoding resulting in an opcode for a transaction end instruction (tend), the value in the mode register 314 may be set to a non-transaction mode operation value. In response to the decoding resulting in an opcode for a transaction suspend instruction (tsuspend), the value in the mode register 314 may be set to a suspended execution mode of operation value. In response to the decoding resulting in an opcode for a transaction resume instruction (tresume), the value in the mode register 314 may be set to a transaction mode operation value. In addition, as described hereafter, the operating system 330 may also set the value in this mode register 314 to an interrupt or preempted execution mode of operation value in response to the occurrence of an interrupt while the mode register 314 stores a value indicating that the processor 310 is in a transaction mode.

The other hardware elements and software mechanisms may access the mode register 314 to determine what mode of operation the processor is operating in at the time of an interrupt. Access to the mode register 314 may be obtained via the hardware mode register interface 313 in the transaction preemption checkpoint hardware 318 of the transactional memory system logic 316.

The program registers 320 store values used by the code executed by the processor pipeline 312 as the instructions in the code are processed within the pipeline 312. The transaction checkpoint registers 322 store the state of the program registers 320 in response to a transaction being started in the processor pipeline 312, e.g., in response to a transaction begin instruction (tbegin) flowing into the processor pipeline 312. These transaction checkpoint registers 322 may also store the state of the program registers 320 at a time in the middle of a transaction when a transaction recheckpoint instruction is executed, as described hereafter. For a transaction checkpoint generated in the middle of the execution of a transaction, an additional flag bit may be set in these registers 322 to indicate that the transaction was restarted after a significant delay and that the hardware might not have been able maintain the log of potentially conflicting memory operations (for example changes to memory locations read by instructions within the transaction). Given that the transaction memory log may not be complete, the transaction must be aborted and the checkpoint is to be used for roll-back of a transaction, such as during an abort of the transaction.

Thus, the transaction checkpoint registers 322 store the state of the registers 320 just prior to entry into the transaction. These registers 322 will only store a transaction recheckpoint in the case where a transaction has been preempted and is being recovered and resumed. The precise register state of the program registers 320 at a point in time when an interrupt occurs during a transaction, i.e. when the processor 310 is operating in a transaction mode as indicated by the mode register 314, may be stored in an interrupt context record data structure 362 of a memory 360, as described in greater detail hereafter.

The hardware pre-transaction state interface 315 provides a hardware interface through which the operating system 330 and other hardware elements may access the transaction checkpoint registers 322. The interface 315 may be used to both copy over the program registers 320 to the transaction checkpoint registers 322 and to read the transaction checkpoint register state from the transaction checkpoint registers 322. For example, when a transaction begin (tbegin) instruction is processed by the processor pipeline 312, the decoding of this tbegin instruction sends a signal to the transactional memory system logic 316 to cause the program registers 320, or at least a portion of these registers 320, to be copied over to transaction checkpoint registers 322 via the hardware pre-transaction state interface 315. This copy may also be done lazily as those program registers are overwritten during the execution of a transaction. Moreover, when a transaction abort condition occurs, a transaction abort handler 340 of the operating system 330 may restore the state of the program registers 320 by rolling-back changes to the program registers 320 using the transaction checkpoint register state stored in the transaction checkpoint registers 322, via the hardware pre-transaction state interface 315.

The hardware termination interface 317 provides logic for terminating a transaction without affecting program control flow. For example, the hardware termination interface 317 may be used by the operating system to terminate any currently executing transaction and reclaim any resources, or facilities, associated with that transaction, in order to enable subsequent use of the transactional facility. The hardware termination interface 317 may be used by the transaction abort handler 340 to restore the state of the program registers 320 and memory that was changed by the transaction such that the changes made by the transaction are rolled-back and not committed. The hardware termination interface 317 may work in conjunction with the hardware pre-transaction state interface 315 to save, in an interrupt context record data structure 362 in memory 360 for the thread executing the transaction, the pre-transaction state information from the storage device 322 when terminating the transaction.

The preempted transaction logic 319 of the transactional memory system logic 316 may be implemented in hardware or a combination of hardware and software, e.g., firmware. The preempted transaction logic 319 operates to store the transaction state information from the program registers 320 and/or the transaction checkpoint registers 322 to an interrupt context record data structure 362 in memory 360 when a transaction is interrupted or preempted, as described hereafter. This logic may be invoked, for example, by the operating system 330 or an interrupt handler 338 associated with the operating system 330 as described hereafter.

As shown in FIG. 3, the operating system 330 includes interrupt handlers 338 and operational state determination logic 332 for determining the operational state of the processor 310 in response to the occurrence of an interrupt or exception condition. While this logic 332 is shown as separate from the interrupt handlers 338, this logic 332 may in fact be integrated with the interrupt handlers 338 such that the interrupt handlers are augmented with logic to determine the operational mode of the processor 310. The operational state determination logic 332 may be used by the interrupt handlers 338 to access the mode register 314 via the hardware mode register interface 313 to retrieve a value indicative of the operational state of the processor 310 at the time of an interrupt. For example, the value in the mode register 314 may indicate whether the processor 310 was in a non-transactional mode, a transactional mode, or a suspended/preempted mode of operation at the time of the interrupt. In this way, the interrupt handlers 338 may determine whether the interrupt occurred during normal execution of the program, during a transaction portion of the program, or during execution of a suspended block of code or preempting program, i.e. a portion of code that preempted another transaction.

The register state copy logic 334 of the operating system 330 operates to cause the copying of program register 320 to the transaction checkpoint registers 322 or vice versa. The register state copy logic 334 may further interface with the transactional memory system logic 316 to cause the copying of these registers 320 and/or 322 to an interrupt context record data structure 362 in memory 360. The register state copy logic 334, or other hardware in the processor, copies the program registers 320 to the transaction checkpoint registers 322 upon the detection of the begin of a transaction in processor pipeline 312 or upon the execution of a transaction recheckpoint instruction, as described hereafter. When an interrupt handler 338 detects an interrupt occurring while the processor 310 is in a transaction mode of operation, the interrupt handler 338 may request that the register state copy logic 334 initiate a copy of the current state of the program registers 320 to the interrupt context record data structure 362 in memory 360 as a first portion of the interrupt context record data structure 362 for the program corresponding to the preempted transaction. This is referred to herein as the "preempted program architected state" as previously discussed above. In addition, after restoring the transaction checkpoint, and thereby rolling back the changes made so far by the transaction so that the state of the processor registers are as they were just prior to beginning the preempted transaction, the interrupt handler 338 may request that the register state copy logic 334 initiate a copy of the this checkpointed state (as was stored in the transaction checkpoint registers 322) to the interrupt context record data structure 362 in memory 360 as a second portion of the interrupt context record data structure 362 for the program corresponding to the preempted transaction. Thus, the interrupt context record data structure 362 in the memory 360 stores both the state information from the program registers 320 and the transactional checkpoint state information from the transaction checkpoint registers 322. This state information may be used to restore the state of the processor 310 after the preempting program or code completes execution or another interrupt occurs requiring switching back to the preempted transaction. This restoring of the state of the processor 310 from the memory 360 may be initiated by the preempted transaction handling logic 336.

The preempted transaction handling logic 336 operates to reschedule the transaction from an instruction or elemental operation at which an interrupt occurred or by simply restarting the transaction, once the interrupt is done being handled by the appropriate interrupt handler 338, e.g., the preempting code finishes executing or another interrupt occurs requiring switch back to the preempted transaction (e.g., a time slice interrupt or the like). The preempted transaction handling logic 336 causes the state of the program registers 320 to be restored to the precise register state from the interrupt context record data structure 362, which was saved at the time of the interrupt as described above, upon the rescheduling of the preempted transaction, such that the preempted transaction will continue execution using the precise state of the program registers 320 at the time of the interrupt. That is, the preempted transaction handling logic 336 may cause the second portion of the interrupt context record data structure 362 to be restored to the program registers 320 with a subsequent transaction recheckpoint instruction being executed to copy the contents of the program registers 320 to the transaction checkpoint registers 322 to regenerate the transaction checkpoint. The preempted transaction handling logic 336 may also cause the first portion of the interrupt context record data structure 362 to then be restored to the program registers 320 so that the precise state of the program registers 320 at the time of the interrupt is restored. The preempted transaction handling logic 336 may cause the processor pipeline 312 to refetch and execute instructions starting with an instruction address corresponding to a program counter value at the time of an interrupt occurring during execution of the preempted transaction.

The transaction abort handler 340 may operate in response to an interrupt occurring when the processor 310 is in a transaction mode of operation such that it is determined that the transaction cannot complete successfully. The transaction abort handler 340, in one illustrative embodiment, may operate to revert the state of the program registers 320 to a state prior to initiating the transaction. Thus, in one illustrative embodiment, the transaction abort handler 340 may restore the program registers 320 to a pre-transaction state using the transaction checkpoint registers 322. Changes to memory may be discarded/rolled-back by the transaction abort handler 340 in a manner generally known in the art. The above is an example of "late" memory restoration, however in other illustrative embodiments, the state of the memory may be restored such that changes are rolled-back upon detection of a transaction failure, i.e. "early" memory restoration, with the transaction abort handler 340 performing other operations for reclaiming transaction facilities and reporting the abort of the transaction to the operating system 330.

Figure 4:
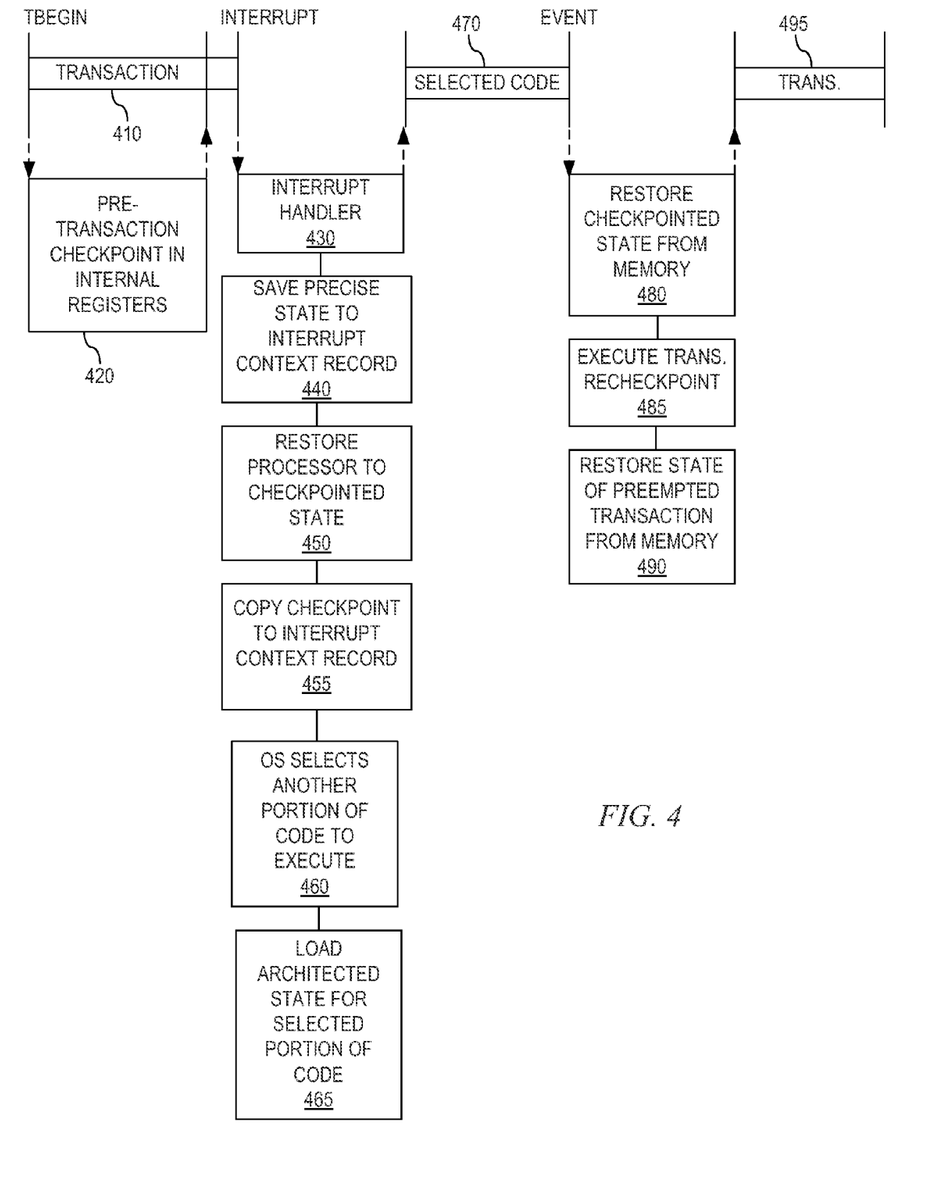
FIG. 4 is an example block diagram illustrating the processing of a preempted transaction in accordance with one illustrative embodiment.

The operation of the above elements in FIG. 3 when a transaction is preempted will now be described in greater detail with reference to FIG. 4. FIG. 4 is an example block diagram illustrating the processing of a transaction having an interrupt occurring during execution of the transaction thereby preempting the transaction in accordance with one illustrative embodiment.

As shown in FIG. 4, a portion of code may be designated as to be executed as part of a transaction 410 through the use of a transaction begin and transaction end instruction encompassing the portion of code to be included in the transaction, as previously described above. The transaction begin and end instructions may be inserted by the programmer, a compiler, or other optimization mechanism. For example, a compiler, as part of the optimizations that it performs on source code, may analyze the code to identify portions of the code that can be performed in parallel and may modify the code so that the portions of code that can be performed in parallel are executed as transactions.

When a transaction begin instruction is encountered by the processor pipeline 312, a transaction is created and tracked by the operating system, such as via transaction controller 350. As a result of encountering the transaction begin instruction, the mode register 314 is updated to store a value indicative of the processor 310 being in a transaction mode of operation and the pre-transaction register state is stored in the transaction checkpoint registers 322, such as by copying the current state of the program registers 320 to the transaction checkpoint registers 322, or at least a portion of the program registers 320 is copied to the transaction checkpoint registers 322 (420). As mentioned before, this saving of the program registers 320 state may also be done lazily, by waiting until the registers 320 are written until a complete copy of the original program registers 320 is made. The transaction (410) is executed with updates to memory (in a reversible manner) and the program registers 320 being performed by the instructions in the transaction.

At some point during the execution of the transaction 410, an interrupt may be encountered. This interrupt instruction causes the processor pipeline 312 to again update the mode register 314 to indicate that the processor 310 is operating in an interrupted or preempted mode of operation.

In response to the interrupt occurring, control is transferred to an interrupt handler 338 (430). The interrupt handler 338, or the operational state determination logic 332 at the request of the interrupt handler 338, determines the operational mode of the processor 310 at the time of the interrupt by reading the value stored in the mode register 314. If the mode of operation is non-transactional, then the interrupt handler 338 simply handles the interrupt in a normal fashion without having to roll-back any changes made by the code. In the depicted example, the mode would be a transaction mode of operation. If the mode of operation is a transaction mode of operation, then a series of operations are performed to manage the transaction checkpoints for the preempted transaction.

If the mode of operation is a transaction mode, then the interrupt handler 338 instructs the register state copy logic 334 of the transaction controller 350 to copy the current state of the program registers 320 to a first portion of an interrupt context record data structure 362 in memory 360, so as to store the precise state of the program registers 320, or the "preempted program architected state", at the time of the interrupt (440). Additionally, the pre-transactional register state is read from the transaction checkpoint registers 322 using the pre-transactional state interface 315. This pre-transactional register state is copied into the program registers 320 to thereby restore the processor to a pre-transactional state (450). This may be done, for example, by having the interrupt handler 338 issue a transaction reclaim (Treclaim) instruction to the processor 310 whose semantics are that the Treclaim instruction restores the processor state to that of the checkpoint by moving the contents of the transaction checkpoint registers 322 to the program registers 320. In addition, the transaction checkpoint, or pre-transactional register state, from the transaction checkpoint registers 322 is written to a second portion of the interrupt context register record data structure 362 (455).

The operating system then selects another portion of code corresponding to the interrupt, e.g., another thread, program, transaction, a suspended block of code, or the like, to execute (460). The selection may be performed in a number of different ways depending upon the type of interrupt that occurred. For example, if the interrupt is a time slice interrupt, then the operating system may select one of a plurality of programs that are executing or need to be executed in parallel using any of a number of policies including a round robin selection policy, a least recently executed policy, or the like. For some interrupts, a particular portion of code or a thread, program, transaction, or the like, must be selected to satisfy the interrupt. The operating system loads any architected state for the selected portion of code (which may include a transaction checkpoint state if this portion of code was previously itself preempted) (465), and executes the selected portion of code (470).

At some time later, in response to an event, such as the completion of the selected portion of code, another interrupt occurring, or the like, the operating system restores the state of the processor to the checkpointed state just prior to the execution of the preempted transaction (480). This restoration of the state of the processor makes use of the transaction checkpoint state information which was saved to the interrupt context record data structure 362 in memory 360 at 455.

Having restored the state of the processor to that contained in the transaction checkpoint portion of the interrupt context record, a transaction recheckpoint instruction (Trecheckpoint) is sent to the processor 310 by the operating system 330 to cause the processor to load its transaction checkpoint registers 322 with the state of the processor registers 320 for the restored transaction (485). In such a case, the register state copy logic 334 of the transaction controller 350 may operate to copy over the state of the program registers 320 to the transaction checkpoint registers 322 so as to regenerate the transaction checkpoint and may set a flag value corresponding to this transaction checkpoint to indicate that this intermediate transaction checkpoint is to be used for transaction abort operations by rolling-back changes made by the transaction.

The operating system then restores the architected state of the preempted transaction (490). This involves using the precise state or "preempted program architected state" stored to the first portion of the interrupt context record data structure 362 at 440. The transaction is then allowed to commence execution from the instruction or elemental operation at which the interrupt occurred or is otherwise restarted (495).

It should be appreciated that the operations shown at 430-490 only occur when a transaction is preempted by another portion of code. Thus, for transactions that are not preempted, the initial pre-transaction checkpoint is generated in internal registers of the processor (420) and the transaction (410) executes. If the transaction has to be aborted for some reason, the pre-transactional checkpoint is used to abort the transaction and roll-back changes made by the transaction. However, if the transaction is preempted, then memory resources may be used to maintain the transaction checkpoints for the original transaction and the portion of code that is preempting the transaction. Thus, it is only in the relatively rare instances when a transaction is preempted that the overhead associated with storing transaction checkpoint data in a memory is incurred and for most transactions, the efficiency and speed of using internal processor registers is achieved.

Figure 5:
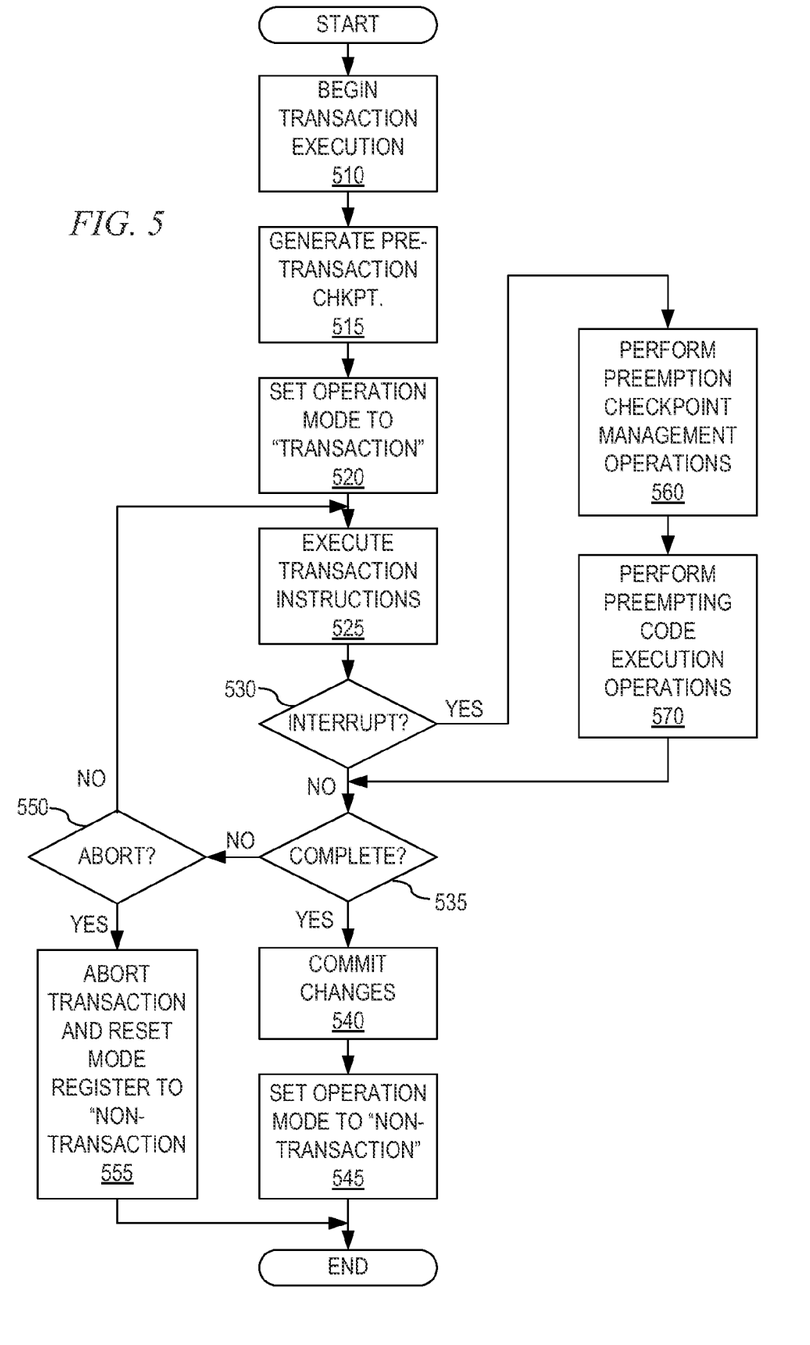
FIG. 5 illustrates a flowchart outlining an example operation for handling the preemption of a transaction in accordance with one illustrative embodiment.

FIG. 5 is a flowchart outlining a general overall operation of processor with regard to the execution of a transaction in accordance with one illustrative embodiment. As shown in FIG. 5, the operation starts with the execution of a transaction begin instruction or other equivalent instruction indicating the start of a transaction (step 510). A pre-transaction checkpoint is generated and stored in internal processor registers (step 515). A value in a mode register of the processor is reset from a non-transactional mode value to a transactional mode value (step 520). The transaction is then executed (step 525) and a determination is made as to whether an interrupt occurs (step 530). If not, the operation determines if the transaction is completed (step 535). If so, then the changes made by the transaction are committed (step 540) and the mode register is reset to a non-transactional mode value (step 545). The operation then terminates.

If the transaction is not complete (step 535), then a determination is made as to whether the transaction should be aborted (step 550). If so, then changes made by the transaction are rolled-back (using the pre-transaction state specified in the checkpoint generated at step 515) and the transaction is aborted with a resetting of the mode register value to a non-transactional mode value (step 555). Otherwise, the operation returns to step 525 and continues to execute the transaction.

If the transaction encounters an interrupt while the processor is in the transactional mode, then preemption checkpoint management operations are performed (step 560) and the preempting code execution operations are performed (step 570). These are provided in greater detail in FIG. 6. The operation then returns to step 535.

Figure 6:
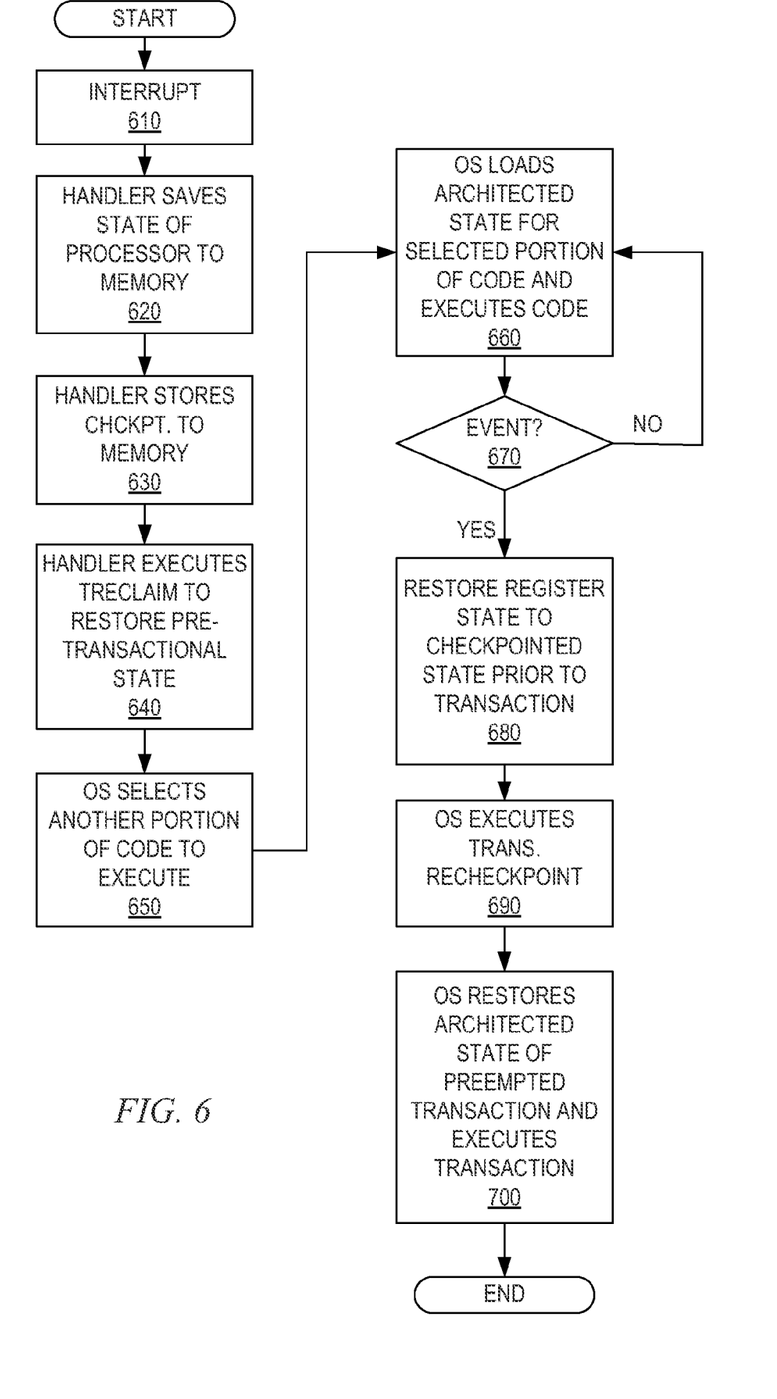
FIG. 6 is a flowchart outlining an example operation for performing preemption checkpoint operations in accordance with one illustrative embodiment.

FIG. 6 is a flowchart outlining an operation for preemption of a transaction in accordance with one illustrative embodiment. The operation outlined in FIG. 6 may correspond to steps 560 and 570 in FIG. 5, for example. As shown in FIG. 6, the operation starts with an interrupt occurring while a processor is in a transactional mode of operation (step 610). An interrupt handler is invoked to save an architected state of the processor to an interrupt context record data in memory for the program corresponding to the preempted transaction (step 620). The interrupt handler extracts the transaction checkpoint data and stores it to the interrupt context record data structure in memory (step 630). The interrupt handler executes a transaction reclaim (Treclaim) instruction to restore the processor to a pre-transactional state using the transaction checkpoint stored in internal processor registers (step 640).

The operating system then selects another portion of code, e.g., another program, suspended code block, transaction, or the like, to execute (step 650). The operating system loads the architected state for the selected portion of code and executes it (step 660). A determination is made as to whether an event occurs that requires the stopping of the execution of the selected portion of code, e.g., completion of the execution, an interrupt occurring, or the like (step 670). If not, the operation returns to step 660 and continues to execute the selected portion of code. If an event occurs, then the operating system restores the processor registers to a state just prior to the execution of the preempted transaction using the transaction checkpoint from memory (step 680). The operating system executes a transaction recheckpoint (Trecheckpoint) instruction to regenerate the transaction checkpoint in the internal processor registers with a flag being set to identify the regenerated transaction which might need to be aborted if any memory log state was lost during the preemption transaction at which time the checkpoint may be used in roll-back operations (step 690). The operating system then restores the architected state of the preempted transaction using the precise state stored to the interrupt context record prior to executing the preempting program, and initiates execution of the transaction from the point at which the transaction was preempted (step 700). The operation then ends, such as by returning to step 525 in FIG. 5, for example.

The preempted transaction checkpoint data management mechanisms of the illustrative embodiments can be used for many different purposes including computer program tracing, debugging, and the like. In addition, the mechanisms of the illustrative embodiments may be used to support proper scheduling of threads in speculative multithreading. In speculative multithreading, a sequence of speculative threads are spawned by a main thread where each speculative thread is assigned a sequence number identifying the thread and the position in the sequence in which the thread should commit. The mechanisms of the illustrative embodiments may be used to manage transaction checkpoint data in support of preemption of transactions, thereby allowing parallel execution using multithreading facilities of a multithreaded data processing system.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system, comprising:
a processor; and
a memory coupled to the processor, wherein the processor comprises logic that operates to:
generate a transaction checkpoint data structure in internal registers of the processor, wherein the transaction checkpoint data structure stores transaction checkpoint data representing a state of program registers at a time prior to execution of a corresponding transaction;
execute the transaction, wherein the transaction comprises a first portion of code that is to be executed by the processor;
receive an interrupt of the transaction while executing the transaction;
store the transaction checkpoint data to a data structure in the memory of the data processing system in response to receiving the interrupt;
execute a second portion of code, different than the first portion of code; and
restore a state of the program registers using the data structure in the memory of the data processing system in response to an event occurring causing a switch of execution of the processor back to execution of the transaction, wherein the data structure in the memory is an interrupt context record data structure for a program corresponding to the transaction, and wherein the transaction checkpoint data is stored in a first portion of the interrupt context record data structure, and wherein restoring a state of the program registers using the data structure in the memory of the data processing system comprises:
restoring the program registers to a state corresponding to a state prior to executing the transaction based on the checkpoint data stored in the first portion of the interrupt context record data structure in the memory; and
executing a transaction re-checkpoint instruction to generate a new transaction checkpoint data structure in the internal registers of the processor.

2. The system of claim 1, wherein the logic further operates to copy state data, identifying a state of the program registers at the time of the interrupt, from the program registers to a second portion of the interrupt context record data structure.

3. The system of claim 2, wherein restoring a state of the program registers using the data structure in the memory of the data processing system further comprises:
    restoring the program registers to a state corresponding to a state when the interrupt was received based on the state data stored in the second portion of the interrupt context record data structure.

4. The system of claim 1, wherein the logic further operates to:
    retrieve a processor mode value from a processor mode register;
    determine if the processor mode is a transaction mode; and
    perform the operations of storing the transaction checkpoint data, executing the second portion of code, and restoring a state of the program registers only in response to the processor mode being a transaction mode.

5. The system of claim 1, wherein the logic further operates to:
    determine whether the interrupt requires an abort of the transaction; and
    restore a state of the program registers to a state prior to execution of the transaction using the transaction checkpoint data structure stored in the internal registers of the processor in response to a determination that the interrupt requires an abort of the transaction.

6. A computer program product comprising a computer readable storage medium having a computer readable program stored therein, wherein the compute readable program, when executed on a data processing system having a processor and a memory, causes the data processing system to:
    generate a transaction checkpoint data structure in internal registers of the processor, wherein the transaction checkpoint data structure stores transaction checkpoint data representing a state of program registers at a time prior to execution of a corresponding transaction;
    execute the transaction, wherein the transaction comprises a first portion of code that is to be executed by the processor;
    receive an interrupt of the transaction while executing the transaction;
    store the transaction checkpoint data to a data structure in the memory of the data processing system in response to receiving the interrupt;
    execute a second portion of code, different than the first portion of code; and
    restore a state of the program registers using the data structure in the memory of the data processing system in response to an event occurring causing a switch of execution of the processor back to execution of the transaction, wherein the data structure in the memory is an interrupt context record data structure for a program corresponding to the transaction, and wherein the transaction checkpoint data is stored in a first portion of the interrupt context record data structure, and wherein restoring a state of the program registers using the data structure in the memory of the data processing system comprises:
    restoring the program registers to a state corresponding to a state prior to executing the transaction based on the checkpoint data stored in the first portion of the interrupt context record data structure in the memory; and
    executing a transaction re-checkpoint instruction to generate a new transaction checkpoint data structure in the internal registers of the processor.

7. The computer program product of claim 6, wherein the computer readable program further causes the data processing system to copy state data, identifying a state of the program registers at the time of the interrupt, from the program registers to a second portion of the interrupt context record data structure.

8. The computer program product of claim 7, wherein the computer readable program further causes the data processing system to restore a state of the program registers using the data structure in the memory of the data processing system by:
    restoring the program registers to a state corresponding to a state when the interrupt was received based on the slate data stored in the second portion of the interrupt context record data structure.

9. The computer program product of claim 6, wherein the computer readable program further causes the data processing system to:
    retrieve a processor mode value from a processor mode register;
    determine if the processor mode is a transaction mode; and
    perform the operations of storing the transaction checkpoint data, executing the second portion of code, and restoring a state of the program registers only in response to the processor mode being a transaction mode.

10. The computer program product of claim 6, wherein the computer readable program further causes the data processing system to:
    determine whether the interrupt requires an abort of the transaction; and
    restore a state of the program registers to a state prior to execution of the transaction using the transaction checkpoint data structure stored in the internal registers of the processor in response to a determination that the interrupt requires an abort of the transaction.

* * * * *